3,448,161
ALKYLATION PROCESS
Bartolome Garcia, Lake Jackson, and Billy D. Head, Angleton, Tex., assignors to The Dow Chemical Company, Midland, Mich., a corporation of Delaware
No Drawing. Filed Feb. 12, 1968, Ser. No. 704,512
Int. Cl. C07c 3/56
U.S. Cl. 260—671        10 Claims

ABSTRACT OF THE DISCLOSURE

Ethylbenzene is produced by a process comprising simultaneously contacting ethylene, benzene and an aluminum chloride catalyst complex in a reaction zone which is maintained at a temperature between 90° and 250° C. and a pressure of at least 280 pounds per square inch, gauge, wherein the reaction time is not greater than two minutes, the molar ratio of benzene to ethylene is at least one to one and the molar ratio of aluminum chloride, added to the catalyst complex, to benzene is between 0.01 to one and one to one.

Background of the invention

It is well known in the art to produce ethylbenzene by contacting ethylene and benzene in the presence of an aluminum chloride catalyst. Initially, this reaction was carried out at a temperature between 50° and 80° C. and around atmospheric pressure in the presence of at least 0.01 mole of aluminum chloride per mole of benzene. Under these conditions, the reaction was usually complete in not less than around thirty minutes. Typically, the catalyst was rendered inactive after a few runs and discarded.

More recently, in a patent issued to Britton and Vander Weele (U.S. Patent No. 2,403,785), it was disclosed that ethylbenzene production takes place rapidly (i.e. from five to fifteen minutes) when the reaction temperature is at least 90° C., the pressure is between 600 and 1200 pounds per square inch, gauge, and the molar ratio of aluminum chloride to benzene is less than 0.007 to one.

Summary of the invention

It has now been found that ethylbenzene is produced very rapidly by the reaction of ethylene, benzene and an aluminum chloride catalyst complex under a specialized set of reaction conditions. Under the special conditions of the present invention, ethylbenzene is produced in good yields and the ethylene reactant is substantially consumed in a reaction time of less than two minutes and typically in not more than ten to thirty seconds. By use of the present process, the relatively large and expensive reactors heretofore required to provide ample time for the reaction to occur are no longer necessary. They may now be replaced with smaller space-saving, less expensive reactors of simple design. Moreover, the yield of ethylbenzene obtained in a single pass through the reactor zone of the present invention is equal to that achieved only by the costly separation and multiple recycle of unreacted benzene, triethylbenzene and polyethylbenzenes present in the product stream under the previous process conditions. In addition, the catalyst life is somewhat extended by the use of the present invention.

In order to practice the invention, ethylene, benzene and an aluminum chloride catalyst complex are simultaneously contacted in a reaction zone which is maintained at a temperature between 90° and 250° C. and a pressure of at least 280 pounds per square inch, gauge, wherein the reaction time is not greater than two minutes, the molar ratio of benzene to ethylene is at least one to one and the molar ratio of aluminum chloride, added to the catalyst complex, to benzene is between 0.01 to one and one to one. The product mixture is then quickly cooled by any of the conventional methods and the desired ethylbenzene product is separated from the product mixture. As is well known in the art, the liquid product of this reaction contains two phases; an organic upper phase containing unreacted benzene, ethylbenzene, diethylbenzene, some triethylbenzene and a lower phase containing the residual aluminum chloride catalyst complex. In the usual manner of operation, the two phases are mechanically separated and the desired ethylbenzene is obtained by distillation of the organic phase.

Although this process can be carried out in a batchwise manner, it is preferred to conduct the reaction in a continuous process. Preferably then, three streams, one each of ethylene, benzene and an aluminum chloride catalyst complex are simultaneously contacted in such a manner as to achieve quick and thorough mixing while inside the reaction zone. The flow rates of these entering streams are adjusted so that, for a given reaction time, the preferred amounts of reactants are fed to the reaction zone per unit time. After leaving the reaction zone, the ethylbenzene-containing product mixture is preferably quickly cooled to a temperature below about 50° C. and the ethylbenzene is recovered by any of the conventional methods. While fresh aluminum chloride catalyst complex can be used, it is preferred to recycle the residual catalyst complex from a prior ethylbenzene-producing reaction to the incoming catalyst stream. Of course, in this case, it may be necessary to adjust the aluminum chloride catalyst complex stream with respect to the amount of aluminum chloride added so that the incoming stream is within the desired molar ratios previously set forth.

The composition of the aluminum chloride catalyst complex is not critical so long as the proper amount of aluminum chloride has been added and a catalyst promoter, preferably hydrogen chloride, is present therein. The catalyst complex stream, in addition, can contain benzene, ethylbenzene, diethylbenzene, triethylbenzene and the higher polyethylbenzenes. Preferably, if triethylbenzene and/or the polyethylbenzenes are present at all, they are present in minimal amounts. The preferred method of preparing the catalyst complex is to dissolve aluminum chloride in about an equimolar amount of diethylbenzene. Hydrogen chloride is passed over the mixture until all the aluminum chloride has gone into solution. Of course, other methods of preparing the catalyst complex can be employed and will be operable if the proper amount of aluminum chloride has been added and a catalyst promoter is present. For example, ethylbenzene or triethylbenzene can be used to dissolve the aluminum chloride and ethyl chloride or even water can be used as a reaction promoter.

The preferred molar ratio of benzene to ethylene is at least one to one and most preferably between two to one and three to one. Molar ratios higher than around four to one can be employed but are not economical due to the expense required in separating and recycling the large volume of unreacted benzene. The preferred molar ratio of aluminum chloride, added to the catalyst complex, to the benzene reactant is between about 0.01 to one and one to one. Most preferably, this ratio is between about 0.05 to one and 0.10 to one. In general, as this ratio increases over the preferred amounts, undesired polyethylbenzens are formed in increasing amounts and tend to render the catalyst inactive in a short time.

The temperature within the reaction zone is advantageously between 90° and 250° C., preferably between 120° and 200° C. and most preferably between 135° and 160° C. The pressure maintained within the reaction zone is at least 280 pounds per square inch, gauge, and preferably is around 300 pounds per square inch, gauge, or higher. In fact, pressures of 600, 900 or even 1200 pounds per square inch, gauge, suitably can be employed.

The reaction time required for ethylbenzene production and substantial consumption of ethylene is not greater than around two minutes. The reaction is extremely fast under the conditions of the present invention and typically can be complete in not more than sixty seconds and preferably in not more than ten to thirty seconds. The type of reactor employed for conducting the reaction is not critical and a number of the conventional reactors including a bomb, coil and a straight tube reactor can advantageously be employed. The preferred reactor is the straight tube or coil type.

Description of specific embodiment

Specific examples of the practice of this invention are given below. All runs were conducted using 8″ of 0.25-inch tantalum as a straight tube reactor. Three feed lines, one each for ethylene, benzene and the aluminum chloride catalyst complex joined the reactor at a single point. The joining point of the three lines, as well as the reactor proper, was inside as isothermal bath. In each run, the ethylene, benzene and aluminum chloride catalyst complex were fed into the reactor in the given amounts and after leaving the reactor, the ethylbenzene-containing product was cooled in an isothermal bath and analyzed. The temperature, pressure, reaction time, amount of reactants and product are given below in a table form. The product is reported in weight percent based on total product with the polyethylbenzenes accounting for substantially all of the unreported portion of the product.

In each run, the catalyst complex used was prepared as follows: $AlCl_3$ and diethylbenzene were mixed in a one to one molar ratio in a three-necked round bottomed flask. The flask was equipped with a mechanical stirrer, a vent line and a purge line. HCl was passed continuously over the mixture and the mixture was stirred until all of the $AlCl_3$ had gone into solution. An equal volume of benzene was added to the resulting solution and the solution was then refluxed for thirty minutes. The addition of benzene is optional and not necessary to the catalyst complex preparation.

We claim:
1. A process for making ethylbenzene comprising simultaneously contacting ethylene, benzene and an aluminum chloride catalyst complex in a reactor zone which is maintained at a temperature between 90° and 250° C. and a pressure of at least 280 pounds per square inch, gauge, wherein the reaction time is not greater than two minutes, the molar ratio of benzene to ethylene is at least one to one and the molar ratio of aluminum chloride, added to the catalyst complex, to benzene is between 0.01 to one and one to one.
2. A process as defined in claim 1 wherein the product is quickly cooled to a temperature below 50° C.
3. A process as defined in claim 1 wherein the temperature is between 120° and 200° C.
4. A process as defined in claim 1 wherein the pressure is around 300 pounds per square inch, gauge.
5. A process as defined in claim 1 wherein the molar ratio of benzene to ethylene is between two to one and three to one.
6. A process as defined in claim 1 wherein the molar ratio of aluminum chloride, added to the catalyst complex, to benzene is between 0.05 to one and 0.10 to one.
7. A process as defined in claim 1 wherein the reaction time is not more than sixty seconds.
8. A process as defined in claim 1 wherein the aluminum chloride catalyst complex is prepared by dissolving aluminum chloride in about an equimolar amount of diethylbenzene while passing hydrogen chloride over the mixture until all the aluminum chloride has gone into solution.
9. A process as defined in claim 1 wherein the residual aluminum chloride catalyst complex is separated from the product mixture, adjusted with respect to the amount of aluminum chloride added so that it has a molar ratio of aluminum chloride added to benzene equal to that of the incoming catalyst complex stream and recycled to said incoming stream.
10. A process as defined in claim 1 wherein the temperature is between 120° and 200° C., the pressure is about 300 pounds per square inch, gauge, the molar ratio of benzene to ethylene is between two to one and three to one and the product is quickly cooled to a temperature below 50° C.

ALKYLATION PROCESS VARIABLES

| Run No. | Reactants (moles) | | | Reactant ratios | | Temp. (° C.) | Press. (p.s.i.g.) | Reaction time (sec.) | Product distribution (weight percent) | | | |
|---|---|---|---|---|---|---|---|---|---|---|---|---|
| | $C_2H_4$ | $AlCl_3$ | $C_6H_6$ | $C_6H_6/C_2H_4$ | $AlCl_3/C_6H_6$ | | | | $C_6H_6$ | Ethyl-benzene | Diethyl-benzene | Triethyl-benzene |
| 1 | 5.13 | 1.04 | 17.40 | 3.39 | 0.0598 | 95 | 300 | 21.1 | 67.74 | 21.15 | 2.00 | 1.91 |
| 2 | 3.40 | 0.70 | 11.90 | 3.50 | 0.0588 | 115 | 300 | 20.5 | 64.46 | 23.35 | 2.27 | 1.48 |
| 3 | 3.89 | 0.81 | 12.76 | 3.28 | 0.0634 | 161 | 300 | 21.8 | 62.03 | 23.58 | 2.26 | 2.05 |
| 4 | 5.56 | 0.94 | 18.25 | 3.28 | 0.0515 | 200 | 300 | 22.3 | 63.20 | 21.50 | 2.16 | 0.58 |
| 5 | 5.56 | 0.86 | 17.40 | 3.13 | 0.0494 | 178 | 300 | 23.4 | 72.69 | 21.51 | 1.40 | 0.71 |
| 6 | 4.97 | 0.68 | 15.15 | 3.05 | 0.0449 | 164 | 300 | 24.0 | 57.2 | 35.5 | 4.08 | 0.54 |
| 7 | 5.66 | 0.44 | 17.17 | 3.04 | 0.0256 | 164 | 300 | 40.0 | 56.1 | 38.8 | 5.09 | 0.26 |
| 8 | 5.66 | 0.33 | 16.85 | 2.98 | 0.0196 | 166 | 300 | 41.0 | 55.0 | 39.3 | 5.47 | 0.31 |
| 9 | 7.49 | 0.54 | 17.90 | 2.38 | 0.0302 | 156 | 200 | | 57.2 | 34.1 | 3.90 | |
| 10 | 8.78 | 0.51 | 22.00 | 3.51 | 0.0232 | 170 | 300 | | 60.5 | 35.5 | 4.10 | 0.42 |
| 11 | 5.66 | 0.33 | 16.85 | 2.98 | 0.0196 | 166 | 300 | 41.0 | 55.0 | 39.3 | 5.47 | 0.31 |
| 12 | 7.39 | 0.43 | 15.56 | 2.10 | 0.0276 | 171 | 300 | 39.0 | 42.6 | 46.0 | 10.90 | 0.42 |
| 13 | 5.66 | 0.44 | 17.77 | 3.04 | 0.0248 | 164 | 300 | 40.0 | 56.1 | 38.8 | 5.09 | 0.26 |
| 14 | 8.40 | 0.67 | 17.50 | 2.09 | 0.0383 | 163 | 300 | 25.0 | 42.0 | 44.3 | 11.70 | 1.50 |
| COMPARATIVE PRESSURE RUNS | | | | | | | | | | | | |
| 15 | 6.12 | 0.70 | 12.40 | 2.03 | 0.0564 | 21–45 | 80 | 23.1 | 85.8 | 4.6 | 3.7 | 0.6 |
| 16 | 9.18 | 1.34 | 19.76 | 2.15 | 0.0678 | 82–105 | 125 | 21.2 | 80.0 | 8.3 | 1.6 | 0.2 |
| 17 | 9.18 | 0.97 | 18.45 | 2.01 | 0.0526 | 85–95 | 175 | 23.4 | 75.4 | 6.7 | 9.7 | |

References Cited

UNITED STATES PATENTS 2,778,862   1/1957   Gorham et al.   260—671
2,948,763   8/1960   Ashmore   260—671

DELBERT E. GANTZ, *Primary Examiner.*

CURTIS R. DAVIS, *Assistant Examiner.*